United States Patent [19]

Landers

[11] Patent Number: 4,474,223

[45] Date of Patent: Oct. 2, 1984

[54] SPREADING NOISE GENERATED BY LOAD SUPPORTING ELEMENTS OF A TIRE TREAD

[75] Inventor: Samuel P. Landers, Uniontown, Ohio

[73] Assignee: The Goodyear Tire & Rubber Company, Akron, Ohio

[21] Appl. No.: 373,758

[22] Filed: Apr. 30, 1982

Related U.S. Application Data

[63] Continuation of Ser. No. 115,592, Jan. 25, 1980, Pat. No. 4,327,792, which is a continuation of Ser. No. 877,789, Feb. 14, 1978, abandoned.

[51] Int. Cl.$^3$ ............................................. B60C 11/10
[52] U.S. Cl. ................................................ 152/209 R
[58] Field of Search ........................ 152/209 R, 209 P

[56] References Cited

U.S. PATENT DOCUMENTS

| 1,956,011 | 4/1934 | Evans | 152/209 R |
| 2,006,197 | 6/1935 | Ewart et al. | 152/209 R |
| 2,255,994 | 9/1941 | Bush | 152/209 R |
| 2,808,867 | 10/1957 | Buddenhagen et al. | 152/209 R |
| 2,878,852 | 3/1959 | Lippman et al. | 152/209 R |
| 3,023,798 | 3/1962 | Moore et al. | 152/209 R |
| 3,124,821 | 7/1938 | Hubach | 152/209 R |
| 3,535,536 | 10/1970 | Pernau | 152/209 R |
| 3,926,238 | 12/1975 | Vorih | 152/209 R |
| 3,989,780 | 11/1976 | Vorih | 152/209 R |
| 3,998,256 | 12/1976 | Verdier | 152/209 R |

FOREIGN PATENT DOCUMENTS 2713286 10/1977 Fed. Rep. of Germany .
771608 3/1977 South Africa .

OTHER PUBLICATIONS

Willett, Tire Tread Pattern Sound Generation, Tire Science and Technology TSTCA, vol. 3, No. 4, Nov. 1975, pp. 252–266.
Varterasian Research Publication GMR 796, General Motors Corp. Aug. 9, 1968.

Primary Examiner—Michael W. Ball
Attorney, Agent, or Firm—Frank Pincelli

[57] ABSTRACT

Noise generated by load supporting elements of an apparatus (e.g., tread of a tire) having a plurality of repeating design cycles is spread over a broad frequency spectrum. This is accomplished by designing load bearing elements in accordance with the following procedure:

First, determining the maximum number of repeating design cycles which may be placed about the apparatus;

Second, selecting a maximum pitch ratio;

Third, determining the appropriate number of harmonic segments into which the apparatus can be divided;

Fourth, determining the size of each of the harmonic segments and the number of design cycles for each of the harmonic segments;

Fifth, arranging the various design cycles in each of the harmonic segments so that the wave length of the predominant modulation frequency of the segment corresponds to the fundamental length of that segment.

49 Claims, 13 Drawing Figures

SPREADING NOISE GENERATED BY LOAD SUPPORTING ELEMENTS OF A TIRE TREAD

This is a continuation of U.S. application Ser. No. 115,592, filed Jan. 25, 1980 (now U.S. Pat. No. 4,327,792 issued May 4, 1982) which is a continuation of U.S. application Ser. No. 877,789, filed Feb. 14, 1978, now abandoned.

The foregoing abstract is not to be taken as limiting the invention of this application, and in order to understand the full nature and extent of the technical nature of this application, reference must be made to the accompanying drawings and the following detailed description.

BACKGROUND OF THE INVENTION

This invention relates to a pneumatic tire, more particularly to a tread pattern and method of designing a tread pattern for a pneumatic tire.

As a tire travels upon a surface, there occurs a movement of air, creating an audible sound. For any given tread pattern, a certain amount of energy is produced. While two different tread patterns may produce the same amount of quantum energy, the noise produced by each may have dramatically different effects on people. One tire may sound harsh and disagreeable and the other quite acceptable. The difference between the two sounds is in their frequency spectrum or degree of tonality. Tonality being the condition wherein the sound generated is dominated by a single frequency and its harmonice, i.e., a majority of the sound generated being concentrated into very small frequency range of the sound spectrum. Tonality is psychologically upsetting to a listener, creating an uneasy feeling. Additionally, besides being irritating, tonal sounds can be perceived at greater distances and require more soundproofing material than do non-tonal sounds. If a given concentration of sound energy could be spread out over a wider range of frequency, it would reduce the tonality or undesirability of the sound.

Various methods have been suggested in the past to reduce objectionable noise generated by tires by spreading the energy produced over the frequency range. This is done by modulating the event frequency or characteristic frequency by varying the design cycle length about the tire (also known as pitching). However, these methods ignore the potential tonality in the low frequency range which may result from the pitching itself. As the distance between the repeating design cycles are varied, it is possible to produce an objectionable low frequency sound, which may take the form of a low frequency flutter. This low frequency pitching tonality is readily transmitted to the vehicle and depending upon the vehicle may produce objectionable noise or vibrations.

The primary object of the invention is to effectively reduce the tonality of noise generated by a rotating apparatus having radially extending load carrying elements which produce audible noise by the utilization of a particular method of designing load carrying elements.

It is another object of the invention to modulate the noise produced by a rotating apparatus having load carrying elements by effectively spreading the event frequency energy produced over a wide frequency band, thereby reducing tonality.

A still further object of the invention is to control the selection of modulating frequencies and modulating amplitudes used to accomplish the spreading of the event frequency energy so that it does not introduce low frequency pitching tonality.

These and other objects are met and the disadvantage of the prior art are overcome by utilizing the method of the present invention as more particularly described hereinafter.

SUMMARY OF THE INVENTION

The invention is directed to a method of spreading the noise generated by an apparatus (e.g., tread of a tire) over a broad frequency spectrum and an apparatus made in accordance therewith. The method comprises generally of the following steps:

Selecting the maximum number of repeating design cycles which may be placed about the apparatus;

Selecting a maximum pitch ratio;

Determining the appropriate number of harmonic segments in which the apparatus may be divided into in accordance with the following equation:

Equation No. 1:

$$NS = [NP \times (LP - SP)] / [B \times (LP + SP)]$$

where
- NS is the required number of harmonic sequence segments
- NP is the number of pitches (design cycles)
- LP is the longest pitch length
- SP is the shortest pitch length
- B is the modulation index;

Determining the size of each of the harmonic segments and the number of design cycles for each of the harmonic segments;

Arranging the different design cycle lengths in each of the harmonic segments so that the wave length of the predominant modulation frequency of the harmonic segment corresponds to the fundamental length of that segment.

Additionally, to further optimize the spreading of the noise generated, the method may include the steps of determining the proper sequence for the harmonic segments and/or determining the optimum pitch ratio.

DETAILED DESCRIPTION OF THE DRAWINGS

DETAILED DESCRIPTION OF THE INVENTION

Figure 1:
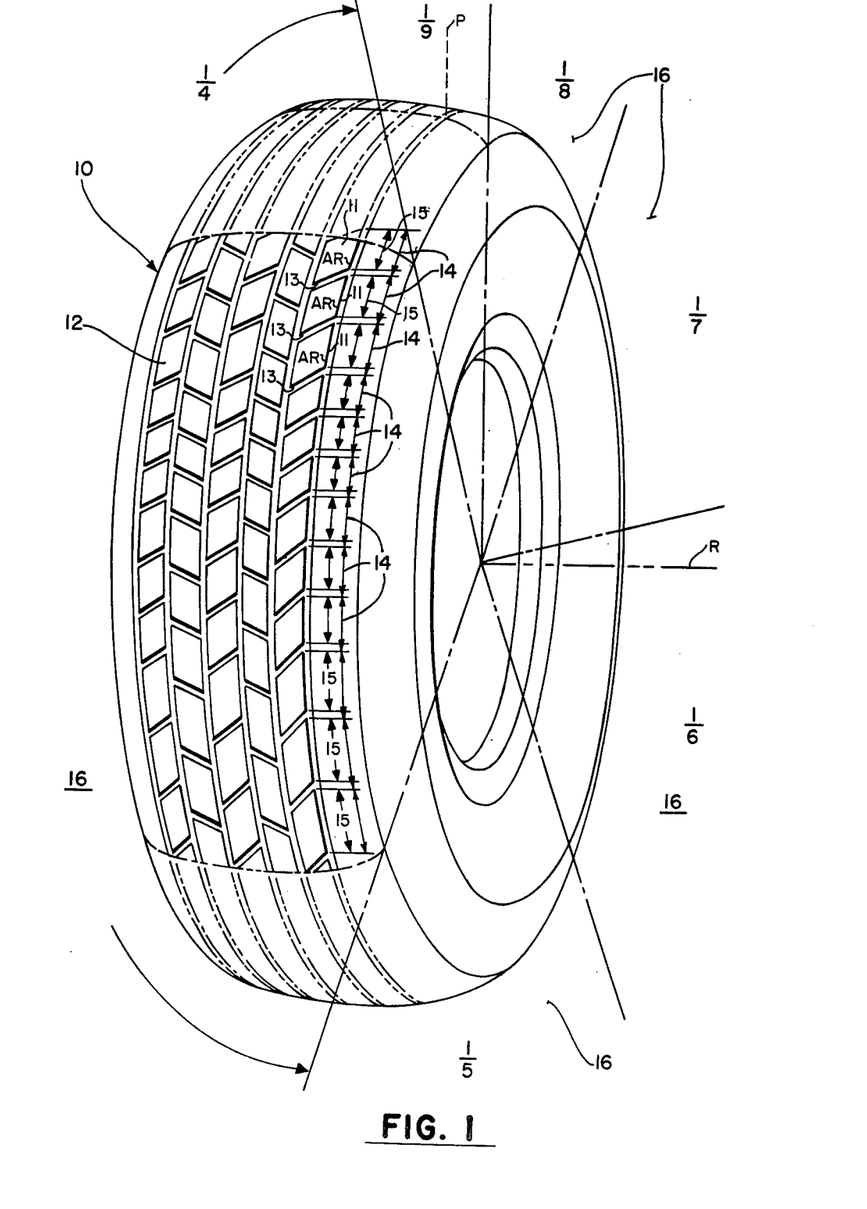
FIG. 1 is a perspective view of a tire having a tread made in accordance with the present invention.

Referring to FIG. 1, there is illustrated a pneumatic tire 10 having a tread portion 12 made in accordance with the present invention. Tire 10 is adapted to rotate around an axis R. The tread portion 12 extends circumferentially about the tire and is divided into a plurality of repeating design cycles 14. Each design cycle includes a load-bearing element 11 and an adjacent groove 13 which separates adjoining load-bearing elements. In the preferred embodiment, the load-bearing element portion of the design cycle defines a dimensional parameter 15 which is modulated in a manner to be described. As shown in FIG. 1, the overall length of the design cycle 14 also defines a dimensional parameter which is modulated in the manner described hereafter. Elements 11 are aligned in a plane P perpendicular to axis R, and the intersection of the perimeter of the elements with the plane define arcs of a circle, such as AR. The ratio of the longest design cycle length to the shortest is defined as the "pitch ratio". The particular arrangement of these different design cycle length segments is the "pitch sequence". The particular pitch sequence and pitch ratio are both very important in the spreading of the sound energy over a wide range of frequencies. The maximum number of pitches that can be used will depend on how short the design cycle length may be. Generally, it is desirable to have the length of design cycle 14 as short as possible without causing physical distortion or unstable tread elements that might cause irregular wear. Accordingly, the first step in designing tread 12 is determining the maximum number of design cycles 14 that can be used for the particular design contemplated. At the present time, passenger tires generally have from about 30 to about 100 pitches, preferably from about 45 to 75; however, the present invention is not limited to such.

After the maximum number of design cycles 14 is selected, the maximum pitch ratio can be determined. Based on the maximum number of pitches previously selected, a pitch ratio is selected as large as possible so as to optimize the effectiveness of the pitching. The selection is generally based on practical performance characteristics. Presently, tires generally have a pitch ratio up to about 1.86 and preferably from about 1.4 to 1.6; however, the present invention may have any desired pitch ratio. In the particular tread illustrated, the pitch ratio is 1.57.

Figures 2, 3, 4, 5, 6:
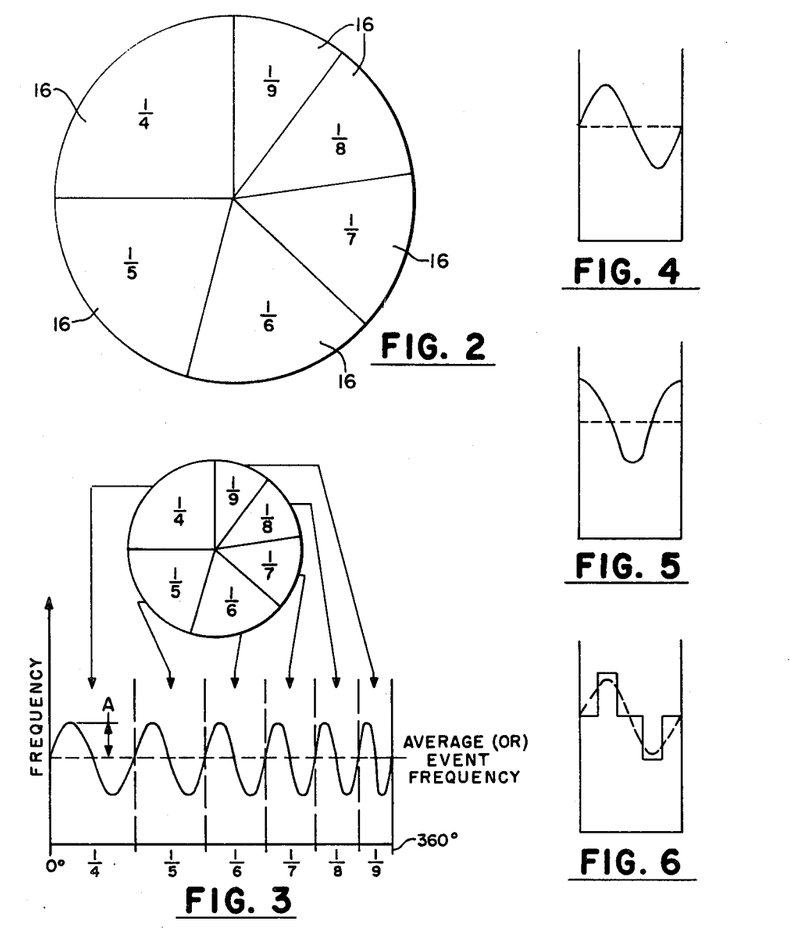
FIG. 2 is a diagrammatical representation illustrating how the tread is divided into a plurality of harmonic sequence segments.
FIG. 3 is a diagrammatical representation illustrating the modulation occurring in each harmonic sequence segment.
FIG. 4 is a diagrammatical representation on how the frequency may be modulated for each of the segments of the tread.
FIG. 5 is a diagrammatical representation illustrating a modified form in which the frequency may be modulated in any one harmonic segment and represents a phase shift from FIG. 4.
FIG. 6 is a diagrammatical representation illustrating a still further modified form in which the frequency may be modulated in any one harmonic segment as represented by three different pitch lengths having a symmetrical pitching sequence.

The tread circumference is then divided into the appropriate number of circumferential harmonic sequence segments 16 (See FIG. 2) determined in accordance with Equation No. 1:

$$NS = [NP \times (LP - SP)]/[B \times (LP + SP)]$$

where
NS is the required number of harmonic sequence segments
NP is the number of pitches (design cycles)
LP is the longest pitch length
SP is the shortest pitch length
B is the modulation index For the purpose of this invention, a harmonic sequence segment comprises of a plurality of adjacent design cycles 14 having various lengths, arranged such that the wave length of the predominant modulating frequency of that segment, that is the modulating frequency having the highest amplitude, corresponds to the fundamental length of that segment. This can be better understood by referring to FIGS. 3 and 4. The calculated number of harmonic segments 16, determined from Equation No. 1 is rounded to the nearest whole number, fractional segments being undesirable. Additionally, there should be a minimal number of harmonic segments. The fewer number of segments 16, the better will be the tonality reduction; however, the fewer number of segments increases the chance of introducing low frequency tonality. The minimum number of harmonic segments 16 which can be used for any particular size tire is determined in accordance with the following relationship:

Equation No. 2:

$$fs = (Nm \times S)/C$$

where
fs is frequency
Nm is the minimum number of harmonic sequence segments
S is the tire speed
C is the tire circumference The speed at which tire noise is generally loud enough to be perceived by the human ear is approximately 30 miles per hour. Substituting this value into Equation No. 2, the following is obtained:

Equation No. 3:

$$fs = \frac{Nm \times 30 \text{ miles per hour}}{C} \quad (48.28 \text{ kilometer/hr})$$

Frequencies less than 30 cycles per second are not generally audible to the human ear but may be perceived as beating and therefore should be avoided. Substituting, Equation No. 3 reduces to:

Equation No. 4:

$$Nm > (C/44.704)$$

where C is in centimeters

For a passenger tire having an outside diameter of approximately 66.04 cm, the circumference is equal to about 203.2 cm. Substituting for C, it can be seen that the number of harmonic sequence segments Nm should be greater than 4.545. Since there can only be a whole number of harmonic segments 16, this number is rounded to the next whole integer; therefore, the number of harmonic sequence segments 16 for this particular tire would be at least 5. The rounding of 4.545 to 5 is an example of normal rounding in which any decimal fraction equal to 0.50 or greater is rounded off to the next larger whole number and any decimal fraction less than 0.50 is rounded off to the next smaller whole number. This value should then be compared with NS calculated from Equation No. 1. If Nm is greater than NS, new values for B should be selected until NS is greater than Nm. If changing B will not correct this, then initial design criteria should be changed, e.g., NP, LP or NP.

The index of modulation in Equation No. 1 is the amplitude of the frequency variation divided by the frequency at which the tone is varied. This can be better understood by reference to FIG. 3 wherein the amplitude of the frequency variation from the event frequency is illustrated by the letter A. The index of modulation controls how much energy is present in each of the side bands of the event frequency and the effectiveness of the pitching. Modulation indices less than 1 are generally ineffective for tire pitching and modulation indices greater than 4 are generally impractical because of limitations due to mold manufacturing, the possibility of irregular wear and the poor visible appearance of the tire. An example of two good modulation indices for pitching are approximately 1.6 and approximately 2.9; because, the fundamental and next greater side bands have nearly equal amplitude.

Figure 7:
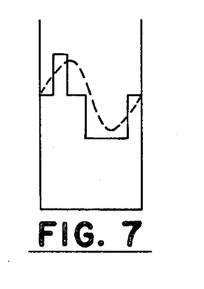
FIG. 7 is a diagrammatical representation illustrating a still yet another modified form in which the frequency may be modulated in any one harmonic segment as represented by three different pitch lengths having asymmetrical pitching sequence.
Figure 8:
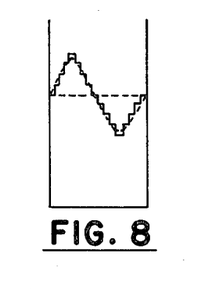
FIG. 8 is a diagrammatical representation illustrating another modified form in which the frequency may be modulated in the harmonic segment as represented by multi-pitch lengths.

Equation No. 1 is based on a purely sinusoidal modulation; when the modulation is complex (i.e., made of several modulations), the modulation must be broken down into component parts. The amplitude of the fundamental harmonic frequency is the only one to be considered. When the modulation is not of a purely sinusoidal type as illustrated in FIGS. 4 and 5, a shape factor must be considered in calculating NS. Dotted lines in FIGS. 6, 7 & 8 illustrate the fundamental frequency for that wave form. The shape factor corrects for the fact that the amplitude of fundamental frequency is less than the actual amplitude of complex frequency modulations. Therefore, taking shape factor into consideration, Equation No. 1 is corrected to the following equation:

$$\text{Equation No. 5: } NS = \frac{NP \times (LP - SP)}{B \times (LP + SP)} \times SF$$

wherein SF is the term which corrects for this shape.

By way of example, and for the purpose of illustration, a passenger tire having 35 pitches, 3 design cycle lengths, a long design cycle length of 7.093 cm, a short design cycle length of 4.518 cm, a modulation index of 1.6 and a shape factor of 1.1, correcting for the non-sinusoidal shape of the 3 pitch sequence, has a calculated number of harmonic segments equal to 5.336, which rounds off to 5 segments; this number being greater than the minimum number of harmonic segments Nm calculated in accordance with Equation No. 4.

Once the number of harmonic segments NS have been determined, the segment sizes are selected from a portion of the harmonic series represented by the following progression:

$$1/1, 1/2, 1/3, 1/4 \ldots 1/n$$

The portion of the harmonic series selected will contain the same number of terms as there are segments, these terms preferably being in consecutive order. The size of each segment corresponds to one of the terms of the progression. For example, if one segment corresponds to $\frac{1}{4}$, then the size of that segment is equal to one-fourth ($\frac{1}{4}$) of the circumference of the tire. It is desirable that the sum of the terms of the series will be nearly equal to 1. For example, if six segments are desired, six consecutive terms would be chosen from the series as follows:

$$\frac{1}{4} + 1/5 + 1/6 + 1/7 + \frac{1}{8} + 1/9$$

The sum of which is approximately equal to 0.996, which is very nearly equal to 1. This procedure forces each of the segments to correspond to a different low frequency moudlation and effectively spreads the low frequency energy in a broad band as illustrated in FIG. 8. Up to now, the size of each segment has only been approximated. The next step is to determine the actual size of each segment. Taking each of the terms of the harominc series, a common divisor is determined by multiplying all of the denominators of all the terms. Then each of the numerators of each term is multiplied by all of the denominators of the other terms of the series chosen. After that has been done, the numerators of each harmonic series term are added and placed over the common divisor; generally, the total numerator and denominator will not be the same. The total numerator obtained as a result of adding all the numerators is now used as the denominator for each harmonic term. Using the numerator calculated for each term, the adjusted fractional share of each term is determined.

An example of this for a tread having six (6) harmonic sequence segments is:

| Harmonic Series Term | | Common Divisor | Adjusted Fraction |
|---|---|---|---|
| $\frac{1}{4}$ | = | $\frac{15{,}120}{60{,}480}$ | $\frac{15{,}120}{60{,}216}$ |
| $\frac{1}{5}$ | = | $\frac{12{,}096}{60{,}480}$ | $\frac{12{,}096}{60{,}216}$ |
| $\frac{1}{6}$ | = | $\frac{10{,}080}{60{,}480}$ | $\frac{10{,}080}{60{,}216}$ |
| $\frac{1}{7}$ | = | $\frac{8{,}640}{60{,}480}$ | $\frac{8{,}640}{60{,}216}$ |
| $\frac{1}{8}$ | = | $\frac{7{,}560}{60{,}480}$ | $\frac{7{,}560}{60{,}216}$ |
| $\frac{1}{9}$ | = | $\frac{6{,}720}{60{,}480}$ | $\frac{6{,}720}{60{,}216}$ |
| TOTAL | = | $\frac{60{,}216}{60{,}480}$ | 1 |

To determine the number of actual pitches that is required in each segment, multiply the adjusted fractional size of the particular segment times the total number of pitches in the tire. This number is then rounded up or down to the nearest whole number. Rounding up means rounding any fractional portion of a whole number up to the next whole number greater in value. Rounding down means rounding any fractional portion of a whole number down to the next whole number less in value. As used in this specification and claims, a rounded number is a number obtained by normal rounding, rounding up or rounding down as previously defined. Occasionally the sum of the pitches contained in each segment does not total up to the required number of pitches because of round-off error. When this occurs, adjust the number of pitches either up or downward in the segment that was rounded the greatest amount in the direction required to correct the total number of pitches. For example,

| Harmonic Series Term | Adjusted Fraction | | Total Pitches | | Required Pitches | Rounded |
|---|---|---|---|---|---|---|
| $\frac{1}{4}$ | $\frac{15,120}{60,216}$ | × | 35 | = | 8.79 | 9(−1) |
| $\frac{1}{5}$ | $\frac{12,096}{60,216}$ | × | 35 | = | 7.03 | 7 |
| $\frac{1}{6}$ | $\frac{10,080}{60,216}$ | × | 35 | = | 5.86 | 6 |
| $\frac{1}{7}$ | $\frac{8,640}{60,216}$ | × | 35 | = | 5.02 | 5 |
| $\frac{1}{8}$ | $\frac{7,560}{60,216}$ | × | 35 | = | 4.39 | 4 |
| $\frac{1}{9}$ | $\frac{6,720}{60,216}$ | × | 35 | = | 3.91 | 4 |
| | | | TOTAL | | | 36(−1) = 35 |

There may be certain instances in which 2 segments may require the same number of pitches. In such event the larger of 2 harmonic segments will comprise of a greater number of long design cycle lengths than the smaller segment. Therefore, the harmonic sequence segments are made to correspond to its design frequency. In any event there must be a whole number of pitches contained in any one particular harmonic segment 16, a fractional pitch is undesirable.

Figure 9:
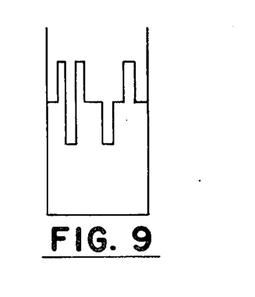
FIG. 9 is a diagrammatical representation of a frequency modulation which is inconsistent with the teachings of the present invention.

The pitching sequence for each harmonic segment 16 may vary; however, each harmonic segment 16 should have a predominant modulation frequency which corresponds to the fundamental frequency of that segment. As previously stated, a harmonic segment is one wherein the wave length of the predominant modulating frequency of that segment, that is the modulating frequency having the highest amplitude, corresponds to the fundamental length of that segment. FIG. 9 illustrates a non-harmonic segment wherein the predominant modulating frequency does not correspond to the segment period. Preferably, a harmonic segment is obtained by slowly changing the pitch length from one extreme to the other and back again in a substantially sinusoidal pattern (i.e., by completing one modulation cycle) only once in each segment as is illustrated in FIG. 4. FIG. 3 illustrates this sinusoidal pattern for the entire circumference of the tread. In the present invention, this modulation is accomplished through the use of three design cycle lengths arranged in a symmetrical sequence as illustrated in FIG. 6. However, any desired number of different pitch lengths may be used. In the embodiment illustrated, the pitch length in between the longest and shortest pitch lengths is the average of the two. The following sequences are suggested for a three pitch type tread design having various pitches per segment. However, various other sequences may be used to achieve the same result.

| Number of Pitches in Segment | Pitching Sequence |
|---|---|
| 4 | 1232 |
| 5 | 12232 |
| 6 | 112332 |
| 7 | 1122332 |
| 8 | 11223322 |
| 9 | 112233321 |
| 10 | 1122233321 |
| 11 | 11122233322 |
| 12 | 112223332221 |
| 13 | 1111222333321 |
| 14 | 11122223333221 |
| 15 | 111222233332221 |
| 16 | 1112222333322221 |
| 17 | 11111222223333322 |
| 18 | 111112222233333222 |
| 19 | 1111122222333332221 |
| 20 | 11111222223333322222 |
| 21 | 111112222233333322222 |

Each of these pitching sequences illustrates a complete period of design cycle length modulation and one complete modulation cycle. The greater number of pitch lengths used, the more closely one can approach a true sinusoidal shape. In any event, there should be at least two pitch lengths. FIG. 8 shows the use of multiple pitches; FIG. 7 shows an unsymmetrical pitching sequence using three different pitch lengths; and FIG. 5 shows a phase shift from the basic sinusoidal modulation. In FIGS. 4 to 8, the predominant frequency modulation frequency corresponds to the segment period.

Figures 10, 11, 12:
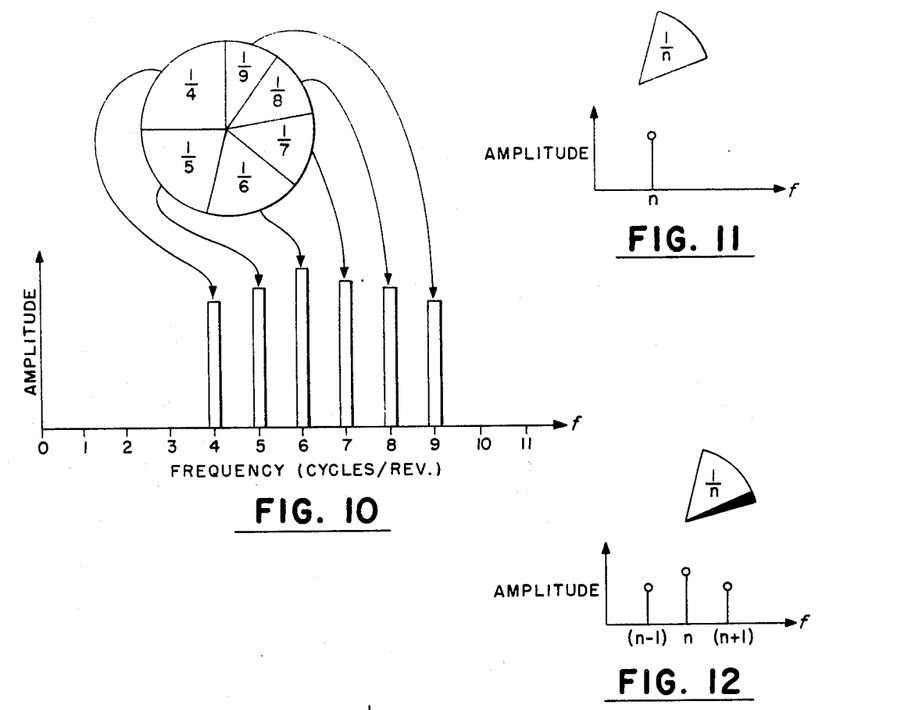
FIG. 10 is a diagrammatical representation illustrating how each of the segments of a tread made in accordance with the present invention corresponds to a different frequency.
FIG. 11 is a diagrammatical representation illustrating how a particular size segment made in accordance with the present invention corresponds to a particular frequency.
FIG. 12 is a diagrammatical representation illustrating how a segment size which is varied from that of the present invention will cause energy to be placed in frequencies other than for which it was designed.

While the size of segments 16 are preferably made very close to the calculated values, the size of segment 16 may vary, preferably, less than 10%. A 25% variation in length represents one-quarter of the wave length of modulation. Variations beyond this limit would cause modulations other than where desired. For example, an ideal segment size would result in a harmonic of a particular low frequency as is illustrated in FIG. 11; whereas, a variation of about 25% or greater would not only cause energy to be put in the particular frequency designed for, but would also put unacceptable amounts of energy in the next order lower, or higher, frequency, as illustrated in FIG. 12. The amplitude of each of the modulating frequencies within a segment can be checked by performing a Fourier Analysis of the frequency modulation caused by the pitching sequence in that segment. The amplitude of the fundamental frequency should be greater than any of the harmonics. The tread pattern can further be refined by proper placement of each harmonic segment. The order in which the segments are arranged may cause a cancellation or reinforcement between each of the segments. Therefore, it is desired to keep the contribution of each segment nearly equal so that the low frequency spectrum is smooth and broad. Generally, this can be accomplished by arranging the segment so that the sizes are mixed up in order; i.e., the sizes are not in consecutive order. The following are examples of segment sequences having been found to be satisfactory for tires having six segments:

| Number of Segments | |
|---|---|
| 6 | $\frac{1}{4}, \frac{1}{9}, \frac{1}{6}, \frac{1}{5}, \frac{1}{8}, \frac{1}{7}$ |

The following segment sequences, by way of example only, have been found to be satisfactory for tires having 4, 5 and 7 segments:

| Number of Segments | |
|---|---|
| 4 | $\frac{1}{3}, \frac{1}{4}, \frac{1}{6}, \frac{1}{5}$ |
| 5 | $\frac{1}{3}, \frac{1}{7}, \frac{1}{5}, \frac{1}{6}, \frac{1}{4}$ |
| 7 | $\frac{1}{4}, \frac{1}{6}, \frac{1}{9}, \frac{1}{5}, \frac{1}{7}, \frac{1}{10}, \frac{1}{8}$ |

To take full advantage of the pitch sequence, the pitch ratio should be optimized. Initially, an upper limit for the pitch ratio was subjectively selected. However, these could very likely be a slightly lower pitch ratio that produces a less tonal sound for any given tire pitch sequence. Whether or not there exists an optimum pitch ratio less than the one originally selected can be determined by performing two Fourier Analyses. The first is performed using the maximum pitch ratio originally selected. The second Fourier Analysis is performed using a pitch ratio that is slightly smaller than the originally selected ratio. By plotting the amplitude of the highest tonal peaks calculated in each analysis versus the pitch ratio, it can be determined if a smaller optimum ratio can be used.

Figure 13:
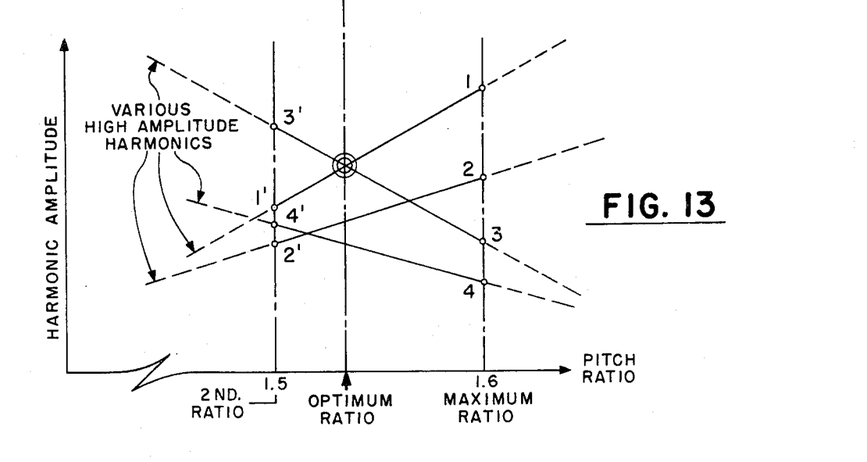
FIG. 13 is a graphical display of the results obtained from a Fourier Analysis conducted on various pitch ratios plotting the amplitude of the highest tonal peaks versus pitch ratio.

First, the highest frequency peak calculated from the Fourier Analysis on the original pitch ratio is plotted. Then the amplitude of the same frequency calculated in the second Fourier Analysis is plotted. The two points are then connected by a straight line. If the line slopes upward as the pitch ratio is increased, a smaller optimum ratio is possible. Next, plot in the same manner the amplitude of the next highest frequency peak that occur in both analyses. Then these two points should be connected by a straight line. Repeat this procedure for the next two highest frequency peaks found in both analyses. The optimum ratio can then be picked off the graph where the difference between the amplitude of all the lines plotted is the least as is illustrated in Figure. This procedure should be repeated for the new optimum ratio because the straight-line method is only an approximation. When the difference between the original pitch ratio and the calculated optimum ratio is about 2% of less, this procedure may be stopped.

The resulting pitch sequence will have a white or pink noise characteristic. For purposes of this invention, white noise shall be defined as sounds in which there is an equal sound intensity in all frequencies in the audible spectrum and pink noise shall be defined as the sound in which the intensity decreases at a rate of three decibals per octave in the frequency spectrum. The sound that is heard when a seashell is placed next to the ear is representative of white noise and pink noise sounds similar to white noise except that it does not have as much high frequency hissing sound; it has a more hollow sound.

While the invention has been described in detail with reference to the tread of a tire, the present invention may be generally applied to rotating apparatus having radially extending load bearing elements. By way of example, V-belts provided with triangularly extending notches for turning about a small radius may take advantage of the present invention by notching the belt in accordance with the teachings herein described. The present invention is applicable for use on snowmobile tracks.

While certain representative embodiments and details have been shown for the purpose of illustrating the invention, it will be apparent to those skilled in the art that various changes and other modifications may be made therein without departing from the spirit or scope of the invention.

What is claimed is:

1. A tire provided with a tread having a plurality of load supporting elements placed about the circumference of said tire, said tread comprising:

a plurality of repeating design cycles placed continuously about the circumference of said tire, said design cycles having at least two different pitch lengths including a shortest pitch length and a longest pitch length arranged about said tread so as to provide a plurality of not less than three harmonic segments of different lengths, not more than one-half of the length of any of said three harmonic segments comprising consecutive pitches of the same length, each of said three harmonic segments including at least one of each different pitch length used in the tire, the boundary between said harmonic segments being determined by a transition from a pitch length longer than said shortest pitch length to said shortest pitch length, the rounded fractional portions of the circumference represented by the lengths of the three harmonic segments corresponding to three different terms of the group consisting of the first nine terms of the harmonic series, each of said harmonic segments corresponding to a different frequency in the sound spectrum.

2. A tire provided with a tread having a plurality of load supporting elements placed about the circumference of said tire, said tread comprising:

a plurality of repeating design cycles placed continuously about the circumference of said tire, said design cycles having at least two different pitch lengths including a shortest pitch length and a longest pitch length arranged about said tread so as to provide a plurality of not less than three harmonic segments of different lengths, not more than one-half of the length of any of said three harmonic segments comprising consecutive pitches of the same length, the boundary between said harmonic segments being determined by a transition from a pitch length longer than said shortest pitch length to said shortest pitch length, the rounded fractional portions of the circumference represented by the lengths of the three harmonic segments corresponding to three different terms of the group consisting of the first nine terms of the harmonic series, each of said three harmonic segments corresponding to a different frequency in the sound spectrum and comprising:

(1) a first harmonic segment having a first length varying by ten percent or less from a length corresponding to a first term of said three different terms;

(2) a second harmonic segment having a second length varying by ten percent or less from a length corresponding to a second term of said three different terms and (3) a third harmonic segment having a third length varying by ten percent or less from a length corresponding to a third term of said three different terms.

3. A tire provided with a tread having a plurality of load supporting elements placed about the circumference of said tire, said tread comprising:

a plurality of repeating design cycles placed continuously about the circumference of said tire, said design cycles having at least two different pitch lengths including a shortest pitch length and a longest pitch length arranged about said tread so as to provide a plurality of not less than three harmonic segments of different lengths, each of said three harmonic segments including at least one of each different pitch length used in the tire, the boundary between said harmonic segments being determined by a transition from a pitch length longer than said shortest pitch length to said shortest pitch length, the rounded fractional portions of the circumference represented by the lengths of the three harmonic segments corresponding to three different terms of the group consisting of the first nine terms of the harmonic series, each of said three harmonic segments corresponding to a different frequency in the sound spectrum, the total number of harmonic segments lying in the range equal to:

[NP×(LP−SP)]/[B×(LP+SP)]

wherein
NP is the number of design cycles,
LP is the longest pitch length,
SP is the shortest pitch length, and
B is the modulation index and includes the range of values from 1.6 to 2.9.

4. A tire provided with a tread having a plurality of load supporting elements placed about the circumference of said tire, said tread comprising:

a plurality of repeating design cycles placed continuously about the circumference of said tire, said design cycles having at least two different pitch lengths including a shortest pitch length and a longest pitch length arranged about said tread so as to provide a plurality of not less than three harmonic segments of different lengths, not more than one-half of the length of any of said three harmonic segments comprising consecutive pitches of the same length, the boundary between said harmonic segments being determined by a transition from a pitch length longer than said shortest pitch length to said shortest pitch length, the rounded fractional portions of the circumference represented by the lengths of the three harmonic segments corresponding to three different terms of the group consisting of the first nine terms of the harmonic series, each of said three harmonic segments corresponding to a different frequency in the sound spectrum, the total number of harmonic segments of different lengths, including said three harmonic segments, being at least as large a number equal to the circumference of the tire measured in centimeters divided by 44.704, but not less than three.

5. A tire provided with a tread having a plurality of load supporting elements placed about the circumference of said tire, said tread comprising:

a plurality of repeating design cycles placed continuously about the circumference of said tire, said design cycles having at least two different pitch lengths including a shortest pitch length and a longest pitch length arranged about said tread so as to provide a plurality of not less than three harmonic segments of different lengths, the boundary between said harmonic segments being determined by a transition from a pitch length longer than said shortest pitch length to said shortest pitch length, the rounded fractional portions of the circumference represented by the lengths of the three harmonic segments corresponding to three different terms of the group consisting of the first nine terms of the harmonic series, each of said three harmonic segments corresponding to a different frequency in the sound spectrum and comprising:

(1) a first harmonic segment having a first length varying by ten percent or less from a length corresponding to a first term of said three different terms;

(2) a second harmonic segment having a second length varying by ten percent or less from a length corresponding to a second term of said three different terms; and (3) a third harmonic segment having a third length varying by ten percent or less from a length corresponding to a third term of said three different terms, the total number of harmonic segments in said tread lying in the range equal to:

[NP×(LP−SP)]/[B×(LP+SP)]

wherein
NP is the number of design cycles,
LP is the longest pitch length,
SP is the shortest pitch length, and
B is the modulation index and includes the range of values from 1.6 to 2.9.

6. A tire provided with a tread having a plurality of load supporting elements placed about the circumference of said tire, said tread comprising:

a plurality of repeating design cycles placed continuously about the circumference of said tire, said design cycles having at least two different pitch lengths including a shortest pitch length and a longest pitch length arranged about said tread so as to provide a plurality of not less than three harmonic segments of different lengths, the boundary between said three harmonic segments being determined by a transition from a pitch length longer than said shortest pitch length to said shortest pitch length, the rounded fractional portions of the circumference represented by the lengths of the three harmonic segments corresponding to three different terms of the group consisting of the first nine terms of the harmonic series, each of said three harmonic segments corresponding to a different frequency in the sound spectrum, the total number of harmonic segments being at least as large as a number equal to the circumference of the tire measured in centimeters divided by 44.704 but not less than three, and lying in the range equal to:

$$[NP \times (LP - SP)] / [B \times (LP + SP)]$$

wherein
NP is the number of design cycles,
LP is the longest pitch length,
SP is the shortest pitch length, and
B is the modulation index and includes the range of values from 1.6 to 2.9.

7. An article, as claimed in claims 1, 2, 3, 4, 5 or 6, wherein the harmonic segments are divided into a plurality of not less than four harmonic segments of different lengths, the rounded fractional portions of the circumference represented by the different lengths corresponding to four different terms of the group consisting of the first nine terms of the harmonic series.

8. An article, as claimed in claims 1, 2, 3, 4, 5 or 6, wherein the harmonic segments are divided into a plurality of not less than five harmonic segments of different lengths, the rounded fractional portions of the circumference represented by the different lengths corresponding to five different terms of the group consisting of the first nine terms of the harmonic series.

9. An article, as claimed in claims 1, 2 or 4, wherein the total number of harmonic segments lies in the range equal to:

$$[NP \times (LP - SP)] / [B \times (LP + SP)]$$

wherein
NP is the number of design cycles,
LP is the longest pitch length,
SP is the shortest pitch length, and
B is the modulation index and includes the range of values from 1.6 to 2.9.

10. An article, as claimed in claims 1, 2, 3 or 5, wherein the total number of harmonic segments, including said three harmonic segments, is at least as large as a number equal to the circumference of the tire measured in centimeters divided by 44.704, but not less than three.

11. An article, as claimed in claims 2, 4, 5 or 6, wherein each of said three harmonic segments includes at least one of each different pitch length used in the tire.

12. An article, as claimed in claim 1, wherein said three harmonic segments comprise:
(1) a first harmonic segment having a first length varying by ten percent or less from a length corresponding to a first term of said three different terms;
(2) a second harmonic segment having a second length varying by ten percent or less from a length corresponding to a second term of said three different terms; and
(3) a third harmonic segment having a third length varying by ten percent or less from a length corresponding to a third term of said three different terms, and wherein the total number of harmonic segments, including said three harmonic segments, is at least as large as a number equal to the circumference of the tire measured in centimeters divided by 44.704 but not less than three.

13. An article, as claimed in claim 1, wherein said three harmonic segments comprise:
(1) a first harmonic segment having a first length varying by ten percent or less from a length corresponding to a first term of said three different terms;
(2) a second harmonic segment having a second length varying by ten percent or less from a length corresponding to a second term of said three different terms; and
(3) a third harmonic segment having a third length varying by ten percent or less from a length corresponding to a third term of said three different terms, and wherein the total number of harmonic segments lies in the range equal to:

$$[NP \times (LP - SP)] / [B \times (LP + SP)]$$

wherein
NP is the number of design cycles,
LP is the longest pitch length,
SP is the shortest pitch length, and
B is the modulation index and includes the range of values from 1.6 to 2.9.

14. An article, as claimed in claim 5, wherein not more than one-half of the length of any of said three harmonic segments comprises consecutive pitches of the same length and wherein the total number of harmonic segments, including said three harmonic segments, is at least as large as a number equal to the circumference of the tire measured in centimeters divided by 44.704, but not less than three.

15. An article as claimed in claim 14, wherein each of said three harmonic segments include at least one of each different pitch length used in the tire.

16. An article, as claimed in claims 1, 2, 3, 4, 5 or 6, wherein the sum of said different terms is greater than one-half.

17. An article, as claimed in claims 1, 2, 3, 4, 5 or 6, wherein there are no harmonic segments in addition to said three harmonic segments having a length equal to or greater than the length of any one of said three harmonic segments.

18. An article, as claimed in claims 1, 2, 3, 4, 5 or 6, wherein the denominators of said different terms include both odd and even integers.

19. An article, as claimed in claim 18, wherein said different terms comprise consecutive terms of the harmonic series.

20. An article, as claimed in claims 1, 2, 3, 4, 5 or 6, wherein the sequence in which the harmonic segments are arranged is different than the sequence in which the corresponding terms of said harmonic series is arranged.

21. An article, as claimed in claims 1, 2, 3, 4, 5 or 6, wherein substantially all said terms are within the group consisting of the first nine terms of the harmonic series.

22. An article, as claimed in claims 1, 2, 3, 4, 5 or 6, wherein the second longest of said three harmonic segments is more than half of the longest of said three harmonic segments, and the shortest of said three harmonic segments is more than half of the second longest of said three harmonic segments.

23. An article, as claimed in claims 1, 2, 3, 4, 5 or 6, wherein the article is divided into a plurality of harmonic segments, and the rounded fractional portions of the segments extending over at least ninety percent of the circumference correspond to terms of the group consisting of the first nine terms of the harmonic series.

24. A tread for a tire adapted to rotate around an axis, the tread comprising a plurality of circumferentially extending tread design cycles defining a plurality of different design cycle lengths varying from a shortest length to a longest length in a predetermined manner in which:

the design cycles are divided into a plurality of not less than three complete modulation cycles of different lengths, the rounded fractional portions of the circumference of the tread represented by the different modulation cycle lengths corresponding to three different terms of the group consisting of the first nine terms of the harmonic series, not more than one-half of the length of any of said three modulation cycles comprising consecutive design cycles of the same length, each of said three complete modulation cycles including at least one of each different design cycle length used in the tread, whereby the character of the sound emitted when the tread rotates against a road surface is altered.

25. A tread for a tire adapted to rotate around an axis, the tread comprising a plurality of circumferentially extending tread design cycles defining a plurality of different design cycle lengths varying from a shortest length to a longest length in a predetermined manner in which:

the design cycles are divided into a plurality of not less than three complete modulation cycles of different lengths, not more than one-half of the length of any of said three modulation cycles comprising consecutive design cycles of the same length, the rounded fractional portions of the circumference represented by the different modulation cycle lengths corresponding to three different terms of the group consisting of the first nine terms of the harmonic series, said three complete modulation cycles, comprising:
(1) a first modulation cycle having a first length varying by ten percent or less from a length corresponding to a first term of said three different terms;
(2) a second modulation cycle having a second length varying by ten percent or less from a length corresponding to a second term of said three different terms; and
(3) a third modulation cycle having a third length varying by ten percent or less from a length corresponding to a third term of said three different terms, whereby the character of the sound emitted when the tread rotates against a road surface is altered.

26. A tread for a tire adapted to rotate around an axis, the tread comprising a plurality of circumferentially extending tread design cycles defining a plurality of different design cycle lengths varying from a shortest length to a longest length in a predetermined manner in which:

the design cycles are divided into a plurality of not less than three complete modulation cycles of different lengths, each of said three complete modulation cycles including at least one of each different design cycle length used in the tread, the rounded fractional portions of the tread circumference represented by the different modulation cycle lengths corresponding to three different terms of the group consisting of the first nine terms of the harmonic series, the total number of modulation cycles lying in the range equal to:

$$[NP \times (LP-SP)]/[B \times (LP+SP)]$$

wherein

NP is the number of design cycles,
LP is the longest design cycle length,
SP is the shortest design cycle length, and
B is the modulation index and lies in the range of values from 1.6 to 2.9, whereby the character of the sound emitted when the tread rotates against a road surface is altered.

27. A tread for a tire adapted to rotate around an axis, the tread comprising a plurality of circumferentially extending tread design cycles defining a plurality of different design cycle lengths varying from a shortest length to a longest length in a predetermined manner in which:

the design cycles are divided into a plurality of not less than three complete modulation cycles of different lengths, not more than one-half of the length of any of said three modulation cycles comprising consecutive design cycles of the same length, the rounded fractional portions of the circumference represented by the different modulation cycle lengths corresponding to three different terms of the group consisting of the first nine terms of the harmonic series, the total number of complete modulation cycles being at least as large as a number equal to the circumference of the tire measured in centimeters divided by 44.704, but not less than three, whereby the character of the sound emitted when the tread rotates against a road surface is altered.

28. A tread for a tire adapted to rotate around an axis, the tread comprising a plurality of circumferentially extending tread design cycles defining a plurality of different design cycle lengths varying from a shortest length to a longest length in a predetermined manner in which:

the design cycles are divided into a plurality of not less than three complete modulation cycles of different lengths, the rounded fractional portions of the circumference represented by the different modulation cycle lengths corresponding to three different terms of the group consisting of the first nine terms of the harmonic series, said three complete modulation cycles, comprising:
(1) a first modulation cycle having a first length varying by ten percent or less from a length corresponding to a first term of said three different terms;
(2) a second modulation cycle having a second length varying by ten percent or less from a length corresponding to a second term of said three different terms; and
(3) a third modulation cycle having a third length varying by ten percent or less from a length corresponding to a third term of said three different terms; the total number of modulation cycles lying in the range equal to:

$$[NP \times (LP-SP)]/[B \times (LP+SP)]$$

wherein
NP is the number of design cycles,
LP is the longest design cycle length,
SP is the shortest design cycle length, and
B is the modulation index and lies in the range of values from 1.6 to 2.9, whereby the character of the sound emitted when the tread rotates against a road surface is altered.

29. A tread for a tire adapted to rotate around an axis, the tread comprising a plurality of circumferentially extending tread design cycles defining a plurality of different design cycle lengths varying from a shortest length to a longest length in a predetermined manner in which:

the design cycles are divided into a plurality of not less than three complete modulation cycles of different lengths, the rounded fractional portions of the circumference represented by the different modulation cycle lengths corresponding to three different terms of the group consisting of the first nine terms of the harmonic series, whereby the character of the sound emitted when the tread rotates against a road surface is altered, the total number of complete modulation cycles being at least as large as a number equal to the circumference of the tire measured in centimeters divided by 44.704, but not less than three, and lying in the range equal to:

$$[NP \times (LP-SP)]/[B \times (LP+SP)]$$

wherein
NP is the number of design cycles,
LP is the longest design cycle length,
SP is the shortest design cycle length, and
B is the modulation index and lies in the range of values from 1.6 to 2.9.

30. An article, as claimed in claims 24, 25, 26, 27, 28 or 29, wherein the boundary between said modulation cycles is determined by a transition from a length of said design cycles longer than said shortest length to said shortest length.

31. An article, as claimed in claims 24, 25, 26, 27, 28 or 29, wherein the design cycles are divided into a plurality of not less than four complete modulation cycles of different lengths, the rounded fractional portions of the circumference represented by the different modulation cycle lengths corresponding to four different terms of the group consisting of the first nine terms of the harmonic series.

32. An article, as claimed in claims 24, 25, 26, 27, 28 or 29, wherein the design cycles are divided into a plurality of not less than five complete modulation cycles of different lengths, the rounded fractional portions of the circumference represented by the different modulation cycle lengths corresponding to five different terms of the group consisting of the first nine terms of the harmonic series.

33. An article, as claimed in claims 24, 25 or 27, wherein the total number of complete modulation cycles lies in the range equal to:

$$[NP \times (LP-SP)]/[B \times (LP+SP)]$$

wherein
NP is the number of design cycles,
LP is the longest design cycle length,
SP is the shortest design cycle length, and
B is the modulation index and includes the range of values from 1.6 to 2.9.

34. An article, as claimed in claims 24, 25, 26 or 28, wherein the total number of complete modulation cycles, including said three complete modulation cycles, is at least as large as a number equal to the circumference of the tire measured in centimeters divided by 44.704, but not less than three.

35. An article, as claimed in claims 25, 27, 28 or 29, wherein each of said three complete modulation cycles includes at least one of each different design cycle length used in the tread.

36. An article, as claimed in claim 24, wherein said three complete modulation cycles comprise:
(1) a first modulation cycle having a first length varying by ten percent or less from a length corresponding to a first term of said three different terms;
(2) a second modulation cycle having a second length varying by ten percent or less from a length corresponding to a second term of said three different terms; and
(3) a third modulation cycle having a third length varying by ten percent or less from a length corresponding to a third term of said three different terms, and wherein the total number of complete modulation cycles, including said three complete modulation cycles, is at least as large as a number equal to the circumference of the tread measured in centimeters divided by 44.704, but not less than three.

37. An article, as claimed in claim 24, wherein said three complete modulation cycles comprise:
(1) a first modulation cycle having a first length varying by ten percent or less from a length corresponding to a first term of said three different terms;
(2) a second modulation cycle having a second length varying by ten percent or less from a length corresponding to a second term of said three different terms; and
(3) a third modulation cycle having a third length varying by ten percent or less from a length corresponding to a third term of said three different terms, and wherein the total number of complete modulation cycles lies in the range equal to:

$$[NP \times (LP-SP)]/[B \times (LP+SP)]$$

wherein
NP is the number of design cycles,
LP is the longest design cycle length,
SP is the shortest design cycle length, and
B is the modulation index and includes the range of values from 1.6 to 2.9.

38. An article, as claimed in claim 28, wherein not more than one-half of the length of any of said three complete modulation cycles comprise consecutive design cycles of the same length and wherein the total number of complete modulation cycles, including said three complete modulation cycles, is at least as large as a number equal to the circumference of the tread measured in centimeters divided by 44.704, but not less than three.

39. An article, as claimed in claim 38, wherein each of said three complete modulation cycles include at least one of each different design cycle length used in the tire.

40. An article, as claimed in claims 24, 25, 26, 27, 28 or 29, wherein the sum of said different terms is greater than one-half.

41. An article, as claimed in claims 24, 25, 26, 27, 28 or 29, wherein there are no complete modulation cycles in addition to said three modulation cycles having a length substantially equal to or greater than the length of any one of said three modulation cycles.

42. An article, as claimed in claims 24, 25, 26, 27, 28, or 29, wherein the denominators of said different terms include both odd and even integers.

43. An article, as claimed in claim 42, wherein said different terms comprise consecutive terms of the harmonic series.

44. An article, as claimed in claims 24, 25, 26, 27, 28 or 29, wherein the sequence in which said modulation cycles are arranged is different than the sequence in which the corresponding terms of said harmonic series is arranged.

45. An article, as claimed in claims 24, 25, 26, 27, 28 or 29, wherein substantially all said terms are within the group consisting of the first nine terms of the harmonic series.

46. An article, as claimed in claims 24, 25, 26, 27, 28 or 29, wherein the second longest of said three modulation cycles is more than half of the longest of said three modulation cycles, and the shortest of said three modulation cycles is more than half of the second longest of said three modulation cycles.

47. An article, as claimed in claims 24, 25, 26, 27, 28 or 29, wherein the article is divided into a plurality of modulation cycles, and the rounded fractional portions of the modulation cycles extending over at least ninety percent of the circumference correspond to terms of the group consisting of the first nine terms of the harmonic series.

48. An article, as claimed in claims 24, 25, 26, 27, 28 or 29, wherein each design cycle comprises at least one load-bearing element and at least one adjacent groove and wherein the design cycle length as a whole defines the dimensional parameter.

49. An article, as claimed in claims 24, 25, 26, 27, 28 or 29, wherein the design cycles are located in a plane perpendicular to the axis, wherein the intersection of the plane with the outer perimeter of the cycles defines arcs of a circle, wherein each design cycle comprises at least one load-bearing element and at least one adjacent groove, and wherein the dimensional parameter is defined by the length of the design cycle as a whole extending along the circle.

* * * * *